(12) United States Patent
McCabe

(10) Patent No.: US 8,776,789 B2
(45) Date of Patent: Jul. 15, 2014

(54) PORTABLE ATHLETIC AIR COOLER WITH FACE ADAPTER

(76) Inventor: Michael J. McCabe, Quincy, IL (US)

(*) Notice: Subject to any disclaimer, the term of this patent is extended or adjusted under 35 U.S.C. 154(b) by 892 days.

(21) Appl. No.: 12/694,000

(22) Filed: Jan. 26, 2010

(65) Prior Publication Data

US 2011/0180069 A1    Jul. 28, 2011

(51) Int. Cl.
*A62B 7/00*    (2006.01)
*F24F 5/00*    (2006.01)
*F25D 3/02*    (2006.01)

(52) U.S. Cl.
USPC ........................................ 128/204.15; 62/420

(58) Field of Classification Search
USPC ............ 128/204.15, 204.14, 204.16, 205.24, 128/203.24, 200.11, 203.29, 203.26, 128/203.16, 203.12, 200.24, 200.14; 454/237, 258, 338, 284; 165/104.34, 165/104.33; 434/247; 62/420, 424, 425
See application file for complete search history.

(56) References Cited

U.S. PATENT DOCUMENTS

| | | | | |
|---|---|---|---|---|
| 5,954,049 | A * | 9/1999 | Foley et al. | 128/203.29 |
| 8,011,368 | B2 * | 9/2011 | Crutchfield | 128/205.25 |
| 2003/0154976 | A1 * | 8/2003 | Dalgetty et al. | 128/203.14 |
| 2009/0071480 | A1 * | 3/2009 | Adams | 128/204.18 |
| 2009/0107491 | A1 * | 4/2009 | Belson | 128/200.14 |
| 2010/0094366 | A1 * | 4/2010 | McCarthy | 607/3 |

* cited by examiner

*Primary Examiner* — Nicholas Lucchesi
*Assistant Examiner* — Brooke Matney
(74) *Attorney, Agent, or Firm* — Brevetto Law Group

(57) ABSTRACT

A portable, low maintenance apparatus is provided for cooling down athletes following strenuous exercise. The apparatus has a repository that holds ice, and a fan configured to blow air through the ice and out of a face adapter part. The face adapter is shaped to provide a cool, breathable stream of air to a user who presses his face up against the adapter.

20 Claims, 4 Drawing Sheets

PORTABLE ATHLETIC AIR COOLER WITH FACE ADAPTER

BACKGROUND

1. Field of the Invention

The present invention relates to systems and methods for people participating in exercise or strenuous activities, and more specifically, to portable equipment for cooling athletes participating in athletic events.

2. Description of Related Art

Americans love sports. We watch sports, we play sports and we encourage our kids to participate in sports. Playing on a sports team is part of growing up. For example, each Saturday morning of the spring, summer and fall parents and children from across the nation gather at tens of thousands of athletic fields for kids' soccer games, baseball games, football games, and other such sports. As kids get older they have the opportunity to participate in numerous other sports, many of which can be strenuous and physically demanding. Other common sports include basketball, cross country running, tennis, lacrosse, baseball, softball and biking, to name but a few.

Participants in physically demanding sports typically work up a sweat as their bodies adjust to compensate for the heat generated by the physical exertion. Sometimes players can become overheated to the point of endangering their health. Sadly, each year a number of children and high school age kids succumb to heat exhaustion during strenuous physical activities, often suffering heat related symptoms. Tragically, this can sometimes result in death.

At organized sporting events the coaches generally keep water coolers on the sidelines for players to drink. For medical emergencies there are chemically activated cooling bags. However, these chemically activated cooling bags tend to be somewhat expensive and are generally reserved for local use on sprains and injuries rather than for general cooling purposes during the course of the game. College teams, and even some high school teams, sometimes place cooling fans or vaporized air blowers near the sidelines for players to use. Such cooling fans are expensive, require a source of electricity, and tend to be bulky and unwieldy to transport to and from games.

The present inventor realized a need for a portable, inexpensive cooling device suitable for use at sporting events.

SUMMARY

Embodiments disclosed herein address the above stated needs by providing apparatus and methods for providing a cool, breathable stream of air to a user. Various embodiments of the apparatus have an insulated, waterproof repository for holding ice, with an intake air duct to take in ambient air from outside the repository and an exit duct to vent out the cooled air. A fan attached to the repository is positioned to blow the ambient air through the ice and out the exit duct. A face adapter is attached to the exit duct, allowing a youngster or other person using the device to breath in a cool stream of air to aid in rapidly cooling the person's body temperature down after participating in a physically demanding sport.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

The present inventor recognized the ineffectiveness of conventional cooling devices for use at strenuous activities such as sporting events. Cooling fans, while helpful, merely cool the surface of the player's skin. As such, conventional cooling fans generally take several minutes to aid in providing relief from the heat of strenuous exercise. The inventor recognized that cooling would be more effective if done from the inside out, rather than merely using a fan to blow air towards the person. The inventor also recognized that providing cool breathable air to a person can be an effective way of rapidly lowering the person's body temperature. Various embodiments of the present invention provide a cool stream of breathable air that an athlete breaths in to rapidly cool down their entire body.

According to various embodiments the air may be cooled by blowing it through ice or another cold substance. After passing through the ice, the air stream is provided to the athlete who breaths in the cooled air. The air, circulating in the person's lungs, uses the body's circulatory system in a manner similar to an automobile radiator. The circulatory system is an integral part of the body's heat regulation system. Blood flows to all extremes of a person's body, constantly pumped by the heart to circulate through the person's lungs and exhale excess heat through the person's breath. Granted, the primary purpose of the circulatory system is to oxygenate the muscles and organs of the body. However, the blood also provides cooling (or heating) to the various parts of the body as it transfers heat during the process of circulation. In this way, the cool, breathable air provided by the embodiments disclosed herein helps to rapidly lower the person's body temperature which may be elevated due to the strenuous exertion from playing a sport.

Providing cool, breathable air is only one aspect of the present invention. In order to best meet the needs of athletic teams it is preferable that at least some embodiments are designed to be portable, relatively inexpensive, and easy to maintain. These aspects allow the device to be readily used by children's athletic teams operating on a shoestring budget as well as higher level, more well funded teams, such as those fielded by colleges, high schools and private clubs. Various embodiments of the present invention meet these needs, and are useful at all levels of athletics in most of the different settings where sporting events take place.

Figure 1:
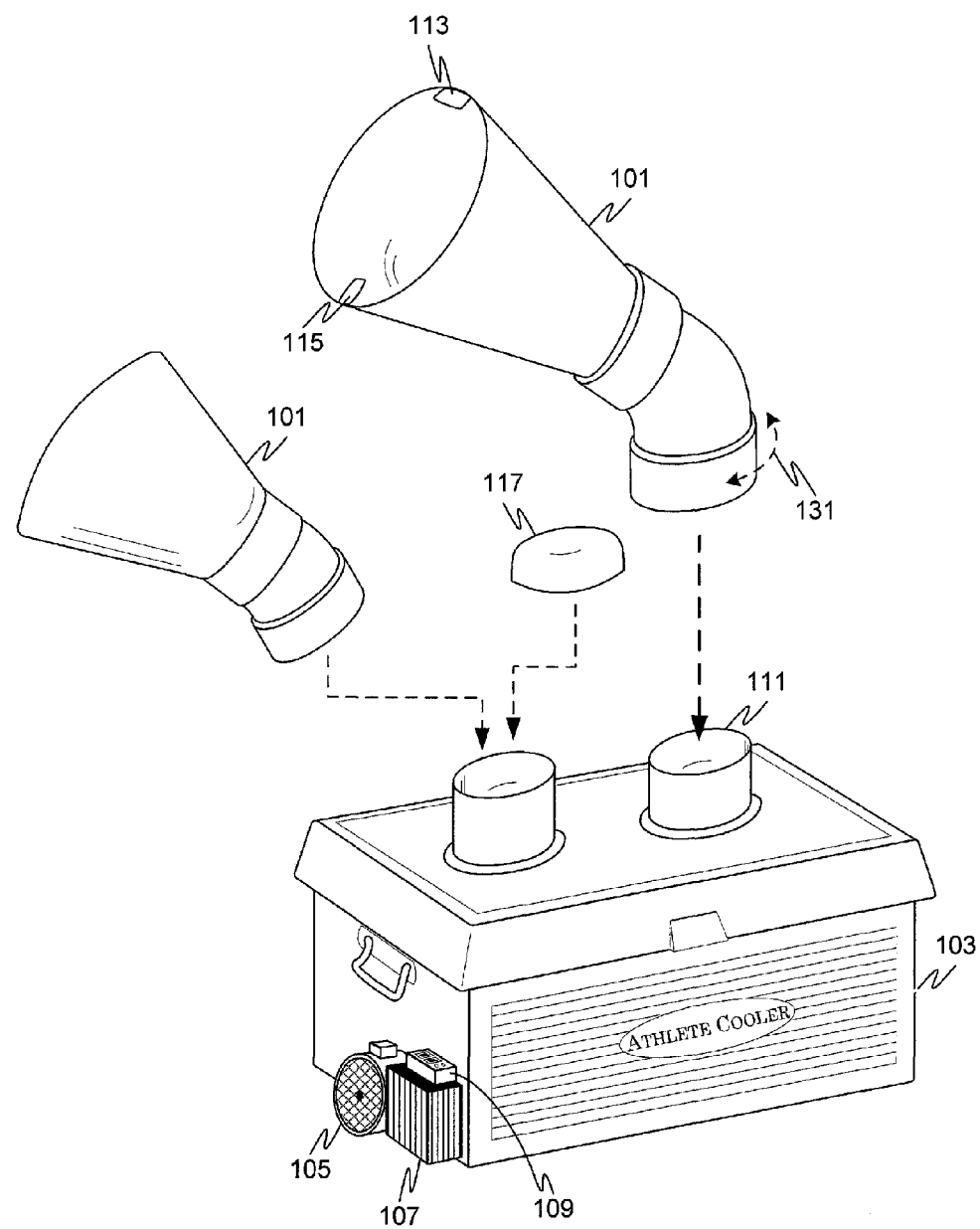
FIG. 1 depicts an embodiment of a portable athletic breathable air cooler with face adapters.

FIG. 1 depicts an embodiment of a portable athletic breathable air cooler with face adapters. The major components of the athlete cooler include a face adapter air chamber 101, ice repository 103, air fan 105, power supply 107, control unit 109, and cooled air exit ducts 111. FIG. 1 depicts an embodiment with a typical arrangement. In other embodiments the components may be arranged in a different manner, so long as they operate in a similar manner to deliver cool, breathable air to a user. There are various embodiments of the device designed to come in different sizes. The smaller sizes tend to be more easily portable than the larger sizes. However, the larger sizes tend to provide greater cooling capacity than the smaller ones. One measurement for the size of the various embodiments is empty weight (without ice), with the various embodiments weighing anywhere from four pounds to 100 pounds. Some embodiments are no greater than 10 pounds empty weight, while other embodiments are no more than 20 pounds, or 25 pounds empty weight, or any such range from four to 100 pounds.

The face adapter air chamber 101 is shaped to accept a user's face being pressed against it, or in some embodiments, placed near it. In practice, the user may either rest his face directly against the adapter 101, or in some instances, keep their face a slight distance from the adapter to prevent the spread of germs. Some embodiments of the face adapter 101 are provided with a forehead rest 113, a chin rest 115, or both. The user may rest his head against the forehead rest 113 or the chin rest 115 to steady his head while breathing the cool air in. In other embodiments the face adapter 101 is rounded in a manner intended to make contact around the outside of a user's face, away from the mouth and nose. In this way the spread of germs or is minimized, allowing for sanitary use from one user to the next. The face adapter air chamber 101 is typically made from a flexible, durable material such as a vinyl or plastic material. The face adapter air chamber 101 may either be opaque or may be made from a clear material so that a user can see through it when the adapter 101 is pressed against their face.

The design of face adapter air chamber 101 is advantageous over conventional face masks used for breathing applications such as the conventional face masks that come with air filters, oxygen face masks for medical purposes or scuba face masks. One advantageous design feature allows the face adapter 101 to be used without the need to strap it on or otherwise affix it to the user's face for proper operation. An athlete can simply come to a cooling station equipped with the present system and place their face against the forehead rest 113 or chin rest 115 to receive a stream of cool, breathable air. In this way, a number of athletes can use the cooling station in rapid succession. By contrast, conventional face masks (e.g., filter face masks, medical oxygen face masks, or scuba face masks) come with an elastic strap to attach the conventional faces masks to the user and keep them in place during use. It would be time consuming and cumbersome for a team of tired, hot athletes to put these conventional face masks on and off in order to receive cool air.

Another significant difference between the face adapter air chamber 101 and a conventional face mask is the volume of air that the mask holds. Various embodiments of the face adapter air chamber 101 are designed to hold a volume of air that is somewhat greater than the average human tidal volume. The human lung tidal volume is the average amount of air taken into the lungs in a single breath during normal respiration—that is, at rest, not during physical exertion. An average adult has a tidal volume of approximately 0.5 liters. The volume of the face adapter air chamber 101 typically approximates the vital lung capacity of an average adult, or about 0.5 liters. The vital lung capacity is the maximum volume of air that can be voluntarily moved in and out of the respiratory system, typically about 4-6 liters. An athlete participating in a strenuous sport, and breathing heavily, breathes in and out the approximate vital capacity of his lungs with each breath. Conventional face masks have a capacity of somewhat less than the tidal volume. In many of the typical embodiments the volume of the face adapter air chamber 101 is 0.5 liters. Other embodiments have face adapters with a volume of at least 0.5 liter to as much as 100 liters, or any amount within this range. In other embodiments the volume of the face adapter air chamber 101 may be greater 1.0 liter, greater than 2.0 liters, between 1.0 and 6.0 liters, or any other such ranges between 0.5 and 100 liters.

The face adapter 101 is designed to be mounted on, removably attached, or otherwise fastened to one of the exit ducts 111 so that cooled air can pass from the chamber of the ice repository 103 to a user. For convenience and ease of use some embodiments of the face adapter 101 simply slip over the exit ducts 111 to form a loose air seal, so it can slide on or off with little effort. To aid in versatility and ease of use various embodiments are designed to allow the face adapter 101 to be rotated in a lateral direction 131 relative to the air exit duct 111 as shown in FIG. 1.

The ice repository 103 is configured to hold ice in sufficient volume to cool down air from ambient temperatures in the atmosphere. A typical embodiment holds approximately 25 pounds of ice, but other designs can hold differing amounts, e.g., from least 10 pounds to 40 pounds or more. The amount of cooling can vary somewhat, depending upon several factors. For the cool, breathable stream of air provided to a user the air is typically cooled by about 30 to 40 degrees, but may be cooled by as little as 5 degrees or as much as 80 degrees, or even more in some instances. The amount of cooling depends upon many variables, including factors such as how much ice is presently in the ice repository 103, how long the ice has been in the ice repository, the speed at which fan 105 is blowing, the type of ice (e.g., $H_2O$, $CO_2$, or the like), the ambient air temperature, the number of face adapter air chambers 101 that are currently being used, whether there is a cap 117 plugging up any unused air exit ducts 111, and other such factors. Typically, the air is cooled by an amount between 25 degrees to 40 degrees (where degrees are measure in Fahrenheit). Sometimes, however, the air may be cooled by as little as 5 or as much as 80 degrees, depending upon the factors mentioned above. In various embodiments the air may be cooled by various amounts, down to a temperature of as low as 32 degrees Fahrenheit, or even slightly lower if the air is allowed to sit within the ice chamber for a period of time before being blown out.

The ice may simply be frozen water, for example, supplied using 10 or 20 pound bags of ice chips or ice cubes. Smaller pieces of crushed ice chips may be slightly more effective in cooling the air than larger ice cubes. The crushed ice chips provide more surface area for the air to blow over and around than larger chunks of ice or ice cubes. Suitable bags of ice may be purchased from nearly any convenience store or grocery store. Using bags of ice for cooling eases the logics of preparing the device for use. For a road game the coach or equipment manager may purchase the bags of ice upon arrival at the city being visited, rather than transporting the bags of ice from the home site. In some implementations other types of ice or cooled liquids may be used aside from water, such as frozen $CO_2$. One advantage in using $CO_2$ is that it tends to last longer than $H_2O$ ice, and, pound for pound, has more cooling power. On the other hand, $CO_2$ is generally more difficult to obtain, and can cause ice "burns" if it comes in contact with skin. Furthermore, when using frozen $CO_2$ care should be taken in setting the venting of the device so that the cooled air is not too cold for athletes to breath.

Using ice rather than a mechanical refrigeration unit cuts down on the expense of the device considerably, and also allows embodiments of the portable athletic breathable air cooler to be more durable and maintenance free than mechanical refrigeration units. The various ice-cooled embodiments disclosed herein tend to be much lighter (when empty) than conventional systems that rely on a mechanical refrigeration units for cooling. In addition, the power requirements tend to be lower since only a fan needs to be powered, as opposed to powering a refrigeration compressor.

In some embodiments the air fan 105 is powered by DC, while in other embodiments the fan 105 is powered by AC. In some embodiments the air fan 105 has a single set blower speed, while in other embodiments the air fan 105 has multiple speeds or is a variable speed fan (adjustable). In practice, the air fan 105 may be any size deemed suitable to those of ordinary skill in the art. In some embodiments the air fan 105 has a blowing capacity of approximately 150 cubic foot per minute (CFM), but may be any value within the range of from 5 CFM up through 2500 CFM. The embodiment of FIG. 1 depicts the fan 105 mounted on a side wall of the repository container 103. In other embodiments the fan 103 can be mounted on any other wall of the repository 103, including the top wall (lid) of the repository, for example, next the air exit ducts 111. The fan 105 may configured to either blow air into the ice chamber, or may be configured to blow air out (or suck air out) of the ice chamber. The fan 105 may be powered by DC, in which case the power supply 107 shown in FIG. 1 includes a battery. In various embodiments the power supply 107 may also include a battery charger to charge up the battery in locations where AC power is available. The device may operate using AC when it is available, and then switch to battery power when there is no readily available source of AC. In some embodiments the power supply 107 may operate solely using AC power, without a battery.

Figure 2:
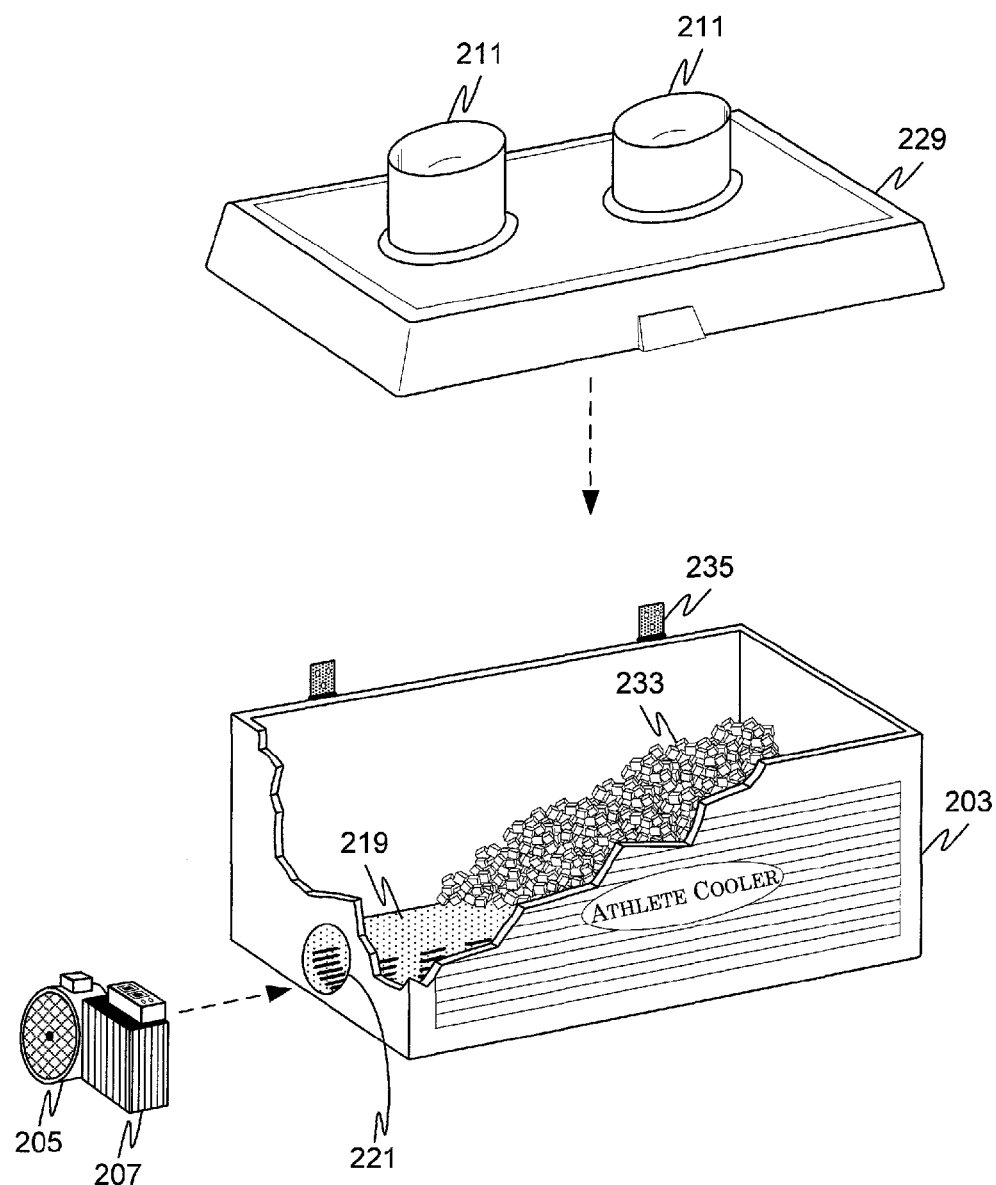
FIG. 2 depicts a cutaway view of the embodiment of the portable athletic breathable air cooler with face adapters.

FIG. 2 depicts a cutaway view of the embodiment of the portable athletic breathable air cooler with face adapters from FIG. 1. In some embodiments the top wall of the repository, the lid 229, is attached to the repository 203 by hinges 235. In such embodiments with hinges the lid 229 may be opened to fill the device with ice, or replenish the ice as it melts. Although various embodiments are equipped with a drain plug, the repository may be emptied through the open lid 229 by tipping the entire device on its side or upside down. In embodiments without hinges 235 the lid 229 simply lifts off the repository 203 in the manner shown in FIG. 2.

The air fan 205 forces air into the ice repository 203, through the ice 233, and then the cooled air travels through the exit ducts 211 to be breathed by an athlete using the face adapter (not shown). To aid in evenly cooling the air various embodiments are configured with an air distribution chamber 219. The air distribution chamber 219 may be in the form of a long, slotted vent, as shown in the figure. Alternative, the air distribution chamber 219 may be a screen, or simply a vent with holes small enough to keep most of the ice from falling through. The ice 233 is piled over and around the air distribution chamber 219 so that the air comes in contact with more surface area of the ice before exiting the ice repository 203 through the exit ducts 211. In various embodiments, the slots are located on only the bottom half of air distribution chamber 219, as shown in FIG. 2, so that the air passes through more ice to blow in from the bottom. Other configurations feature slots all around the air distribution chamber 219 to increase the air flow throughput. In some embodiments a screened or slotted floor can be provided within the ice repository 203, with the fan 205 being configured to blow air underneath the screened floor, up through the ice, and out the exit ducts 211. Some ice chips may fall through the slots or screen of the air distribution chamber 219 without adversely affecting the performance of the device to any great extent.

Returning to FIG. 1, the device is typically configured with a control unit 109 to turn the fan on and off. In some embodiments the control unit 109 may simply be an on/off switch, while in other embodiments a variable speed control is provided to adjust the airflow of the fan 105. For models that use AC the control unit 109 is preferable configured within in a waterproof or water resistant housing. For additional safety, the switch is typically a Ground Fault Interrupt (GFI) switch since melted water may be present.

As the device provides cool air and the ice begins to melt, some amount of water will collect in the bottom of the ice repository 103. In various embodiments the repository 103 is made of an insulated, waterproof material. The walls of the repository 103 may be fabricated from layers of vinyl or plastic with an air or vacuum barrier (or layer of insulation) to provide insulation properties. The amount of insulation can vary somewhat, depending upon the details of the implementation. Typically, the insulative properties of the ice repository 103 should be sufficient to maintain ice in solid form for the duration of the athletic event for which it is intended. For example, some embodiments have sufficient insulation to keep ice for three hours with no more than 25% to 35% melting at an ambient outside temperature of 80 degrees Fahrenheit. Other embodiments may have less insulation in order to decrease the size and weight of the container. Alternatively, the insulative properties of the ice repository 103 be approximately the same as an insulated beverage cooler. It should be noted, however, that as the ice melts in the device it is quick and easy to replenish it with new bags of ice.

Various embodiments of the ice repository 103 are equipped with a water drain hole and valve or plug for draining the water out of the ice repository 103. Generally, the drain hole is left open if the device is being used outdoors and there is a suitable place to drain the water from the melted ice. However, if the device is being used indoors—for example, at a basketball or volleyball game—the drain hole valve can be kept shut until the use is finished and the device can be emptied into a drain, sink, or other suitable place. Some embodiments of the device designed specifically for indoor use may have a compartment underneath the ice repository 103 to collect water. The water compartment prevents the water from sloshing around while the device is being transported, after it has been used and the ice has melted. Embodiments with the water compartment also do not need to be emptied as often, since ice can simply be added to the top as it melts and drains into the water compartment.

Figure 3A:
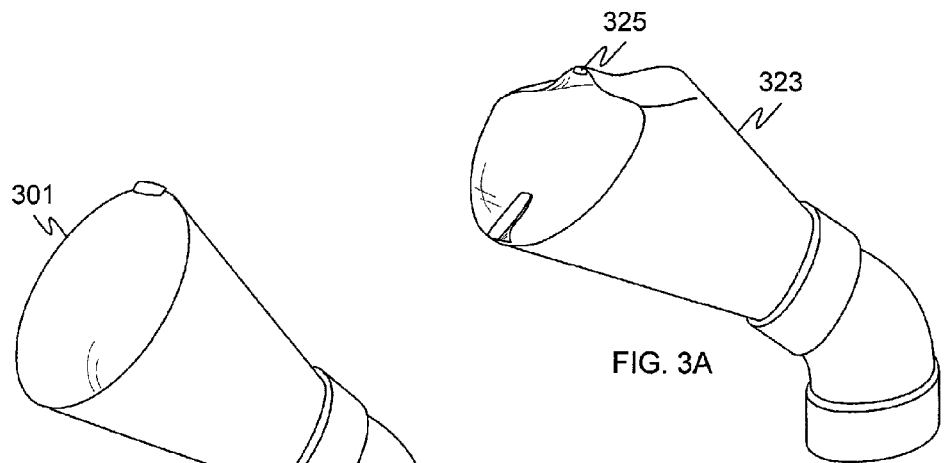
FIGS. 3A and 3B depict two different styles of the face adapter air chamber.
Figure 3B:
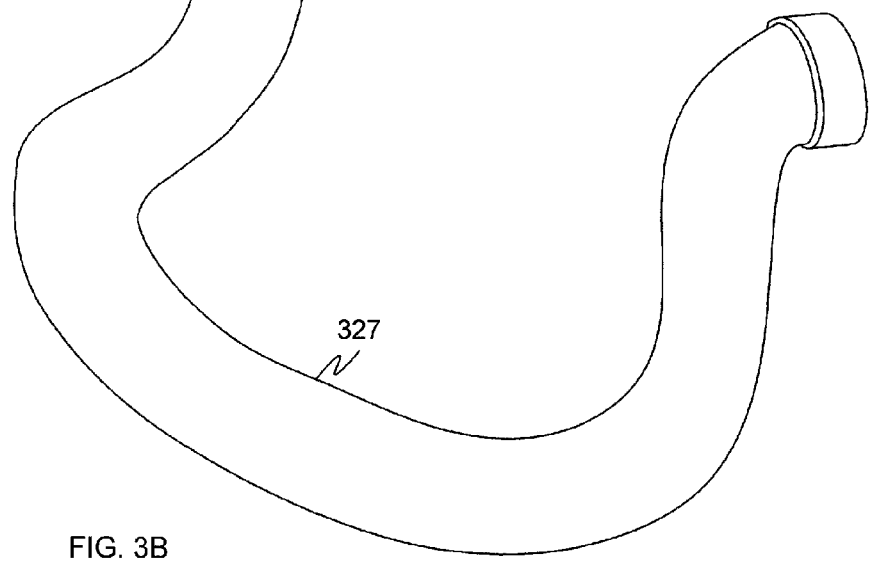

FIGS. 3A and 3B depict two different styles of the face adapter air chamber 301 and 323. The face adapter 301 embodiment of FIG. 3A is contoured so a user can keep his eyes out of the cold air stream. Various embodiments of the face adapter (101, 301, 323) may be made of a flexible, clear plastic material so that the user can see through the face adapter while using it. However, even if the material is transparent the face adapter can sometimes become fogged over due to moisture condensation on the device. The embodiment depicted in FIG. 3A avoids this problem. The contoured face adapter 323 of FIG. 3A allows the user's eyes to remain outside the stream of cold air. The contoured face adapter 323 may be equipped with a nose rest 325, similar to the forehead rest 113 shown in FIG. 1, except designed to rest on or slightly above the bridge of the user's nose while the contoured face adapter 323 is being used. Since the user's eyes to remain outside the contoured face adapter 323 when it is being used, this embodiment tends to be more comfortable for user's who may feel claustrophobic when their face is covered by a shield or other apparatus.

Another embodiment of the face adapter air chamber is shown in FIG. 3B. This embodiment has a long, flexible hose 327 attached to the face adapter. The use of the hose 327 allows a cooling stream of air to be provided to an athlete user who is unable to stand, possibly due to injury or exhaustion. The hose 327 is also useful for spreading out the players of a team who may all be waiting turns to use the device. This avoids a situation where several, hot tired athletes are jockeying for position around the device, waiting for a turn to use it. Instead, the athletes can take a seat on a bench and wait their turn, while the face adapter air chamber 301 connected to air hose 327 is passed around.

Figure 4:
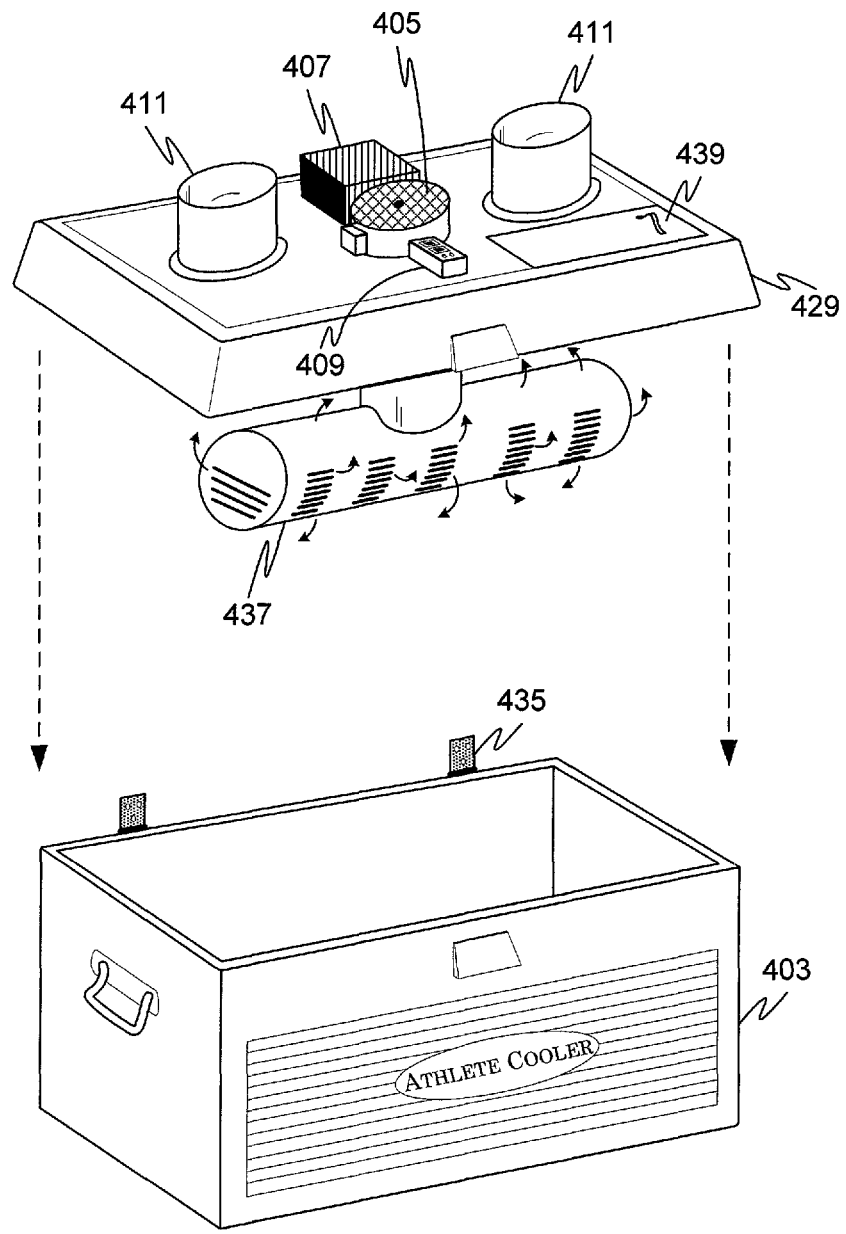
FIG. 4 depicts an embodiment of the portable athletic breathable air cooler with the fan and power supply mounted on the lid of the device.

FIG. 4 depicts an embodiment of the portable athletic breathable air cooler with the fan and power supply mounted on the top wall, or lid, of the device. In this embodiment the lid 439 may be fastened to the repository body 403 with hinges 435, or may simply lift off the repository 403 in the manner shown in the figure. The operation of this embodiment is similar to the embodiment depicted in FIGS. 1 and 2 inasmuch as the air fan 405 forces air into the ice repository 403, and through ice to cool the air. The cool, breathable stream of air then travels through the exit ducts 411 to be breathed by an athlete using a face adapter (not shown). To aid in evenly cooling the air various embodiments are configured with an air distribution chamber 437 which has slots or holes to allow air to flow through but keep most of the ice from entering. The ice surrounds the air distribution chamber 437 so that air can reach more surface area of the ice before exiting the ice repository 403 through the exit ducts 411.

As with the embodiments of FIGS. 1-2, the embodiment depicted in FIG. 4 features air distribution chamber 437 to aid in evenly cooling the air. However, the FIG. 4 embodiment is configured with the air distribution chamber 437 attached to the lid 429. Some embodiments may have an access cover 439 on the top wall or lid 429 to allow access to the repository 403 to fill or replenish it with ice. For those embodiments without an access cover 439 the air distribution chamber 437 should be connected rigidly enough to the lid 429 to allow it to be pushed down into the ice cubes in repository 403.

Although the various embodiments have been described in terms of use by athletes during an athletic event it should be noted that the device is quite useful for other users and purposes. For example, firefighters or emergency workers who exert a great deal of energy in hot, smoke-filled environments may find the device quite useful. Construction workers laboring in hot conditions may also receive relief from the heat by using various embodiments of the present invention. In general, the various embodiments can be quite useful to anyone who needs a rugged, inexpensive means of providing cool, breathable air for the purpose of rapidly cooling down the body temperature.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. An apparatus for providing a cool, breathable stream of air to a user, the apparatus comprising:
    an insulated, waterproof repository configured to hold ice, said repository having an intake air duct configured to accept ambient air from outside the repository;
    a fan directly attached to said repository and positioned to blow air which travels through the intake air duct and into the repository, flowing in between pieces of said ice to come in contact with said ice and cool the air to create the cool, breathable stream of air;
    a cooled air exit duct extending from a wall of said repository to vent the cool, breathable stream of air through the wall of said repository, wherein said wall is a lid of the repository, said lid being configured to be opened in order to replenish the ice; and
    a face adapter configured to be slid onto the exit duct so as to be removably attached to said exit duct to form a loose air seal, said face adapter being shaped to receive a user's face pressed against it to provide the cool, breathable stream of air suitable for breathing without attaching the face adapter to the user's face;
    wherein the face adapter has a volume sufficient to hold at least 0.5 liters of air.

2. The apparatus of claim 1, wherein the face adapter is configured to be removably attached to the air exit duct; and
    wherein the face adapter is configured to be rotated in a lateral direction relative to the air duct.

3. The apparatus of claim 1, wherein the exit duct is a first exit duct and the face adapter is a first face adapter, the apparatus further comprising:
    a second exit duct;
    a second face adapter configured to be attached to the second exit duct a first removable cap configured to cover the first exit duct if the first face adapter is removed; and
    a second removable cap configured to cover the second exit duct if the second face adapter is removed.

4. The apparatus of claim 1, wherein the fan is battery powered.

5. The apparatus of claim 1, wherein said wall is a lid connected to the repository by hinges.

6. The apparatus of claim 1, further comprising:
    a flexible hose configured to attach the face adapter to said cooled air exit duct, wherein the cool, breathable stream of air passes through the flexible hose.

7. The apparatus of claim 1, wherein the repository has a volume sufficient to hold at least 20 pounds of ice.

8. The apparatus of claim 1, wherein an empty weight of the apparatus without the ice is no more than 15 pounds.

9. The apparatus of claim 1, wherein an empty weight of the apparatus without the ice is no more than 25 pounds.

10. The apparatus of claim 1, wherein the ice is frozen water.

11. The apparatus of claim 1, wherein the face adapter includes a chin rest configured for the user's chin to rest on while receiving the cool, breathable stream of air suitable for breathing.

12. The apparatus of claim 11, wherein the face adapter has a volume sufficient to hold at least 1.0 liters of air.

13. The apparatus of claim 1, wherein said face adapter is configured to be aimed by being rotated in a lateral direction relative to the air exit duct.

14. A system mounted on a lid for providing a cool, breathable stream of air, the system comprising:
    an intake air duct configured to accept ambient air;
    a fan directly attached to said lid and positioned to blow ambient temperature air which travels through the intake air duct into a repository configured to hold ice, said ambient temperature air flowing in between pieces of said ice coming in contact with the ice to produce the cool, breathable stream of air;
    a cooled air exit duct extending from the lid of said repository to vent the cool, breathable stream of air through said lid; and
    a face adapter configured to be slid onto the cooled air exit duct so as to be removably attached to said cooled air exit duct to form a loose air seal, said face adapter being shaped to receive a user's face pressed against it to provide the cool, breathable stream of air suitable for breathing without attaching the face adapter to the user's face;

wherein the face adapter has a volume sufficient to hold at least 0.5 liters of air.

15. The system of claim 14, wherein the face adapter is configured to be removably attached to the air exit duct; and wherein the face adapter is configured to be rotated in a lateral direction relative to the air duct.

16. The system of claim 14, wherein the ice is frozen water.

17. The system of claim 14, wherein the face adapter includes a chin rest configured for the user's chin to rest on while receiving the cool, breathable stream of air suitable for breathing.

18. The system of claim 17, wherein the face adapter has a volume sufficient to hold at least 1.0 liters of air.

19. The system of claim 14, wherein the exit duct is a first exit duct and the face adapter is a first face adapter, the system further comprising:

a second exit duct;

a second face adapter configured to be attached to the second exit duct;

a first removable cap configured to cover the first exit duct if the first face adapter is removed; and a second removable cap configured to cover the second exit duct if the second face adapter is removed.

20. The system of claim 14, wherein said face adapter is configured to be aimed by being rotated in a lateral direction relative to the air exit duct.

* * * * *